(12) United States Patent
Kim

(10) Patent No.: US 9,160,424 B2
(45) Date of Patent: Oct. 13, 2015

(54) BLUETOOTH® SYSTEM AND BLUETOOTH® BONDING PROCESS

(75) Inventor: Sang-Don Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1179 days.

(21) Appl. No.: 11/704,148

(22) Filed: Feb. 8, 2007

(65) Prior Publication Data

US 2007/0202807 A1 Aug. 30, 2007

(30) Foreign Application Priority Data

Feb. 8, 2006 (KR) .................. 10-2006-0012292

(51) Int. Cl.
| | | |
|---|---|---|
| *H04B 7/00* | (2006.01) | |
| *H04B 5/02* | (2006.01) | |
| *H04B 5/00* | (2006.01) | |
| *H04L 29/06* | (2006.01) | |
| *H04W 12/06* | (2009.01) | |
| *H04M 1/725* | (2006.01) | |
| *H04W 88/06* | (2009.01) | |

(52) U.S. Cl.
CPC ............... *H04B 5/02* (2013.01); *H04B 5/0062* (2013.01); *H04L 63/0492* (2013.01); *H04L 63/0853* (2013.01); *H04L 63/18* (2013.01); *H04W 12/06* (2013.01); *H04M 1/7253* (2013.01); *H04M 2250/02* (2013.01); *H04W 88/06* (2013.01)

(58) Field of Classification Search
CPC .......... H04M 2250/02; H04M 1/7253; H04W 88/06; H04W 12/06; H04L 63/18; H04L 63/0853; H04L 63/0492; H04B 5/02; H04B 5/0062

USPC .......... 340/500, 540, 568.1, 572.1, 825, 10.1; 455/39, 41.2, 41, 41.1, 411, 420, 500, 455/517; 235/375; 713/171

See application file for complete search history.

(56) References Cited

U.S. PATENT DOCUMENTS

| | | | |
|---|---|---|---|
| 6,892,052 B2 | 5/2005 | Kotola et al. | |
| 7,120,129 B2 * | 10/2006 | Ayyagari et al. | ............. 370/255 |
| 7,522,729 B2 * | 4/2009 | Ishidoshiro | ................ 380/270 |
| 7,689,169 B2 * | 3/2010 | Lee et al. | ..................... 455/41.2 |
| 2002/0090912 A1 * | 7/2002 | Cannon et al. | ................... 455/41 |
| 2002/0123325 A1 * | 9/2002 | Cooper | ......................... 455/411 |
| 2004/0168081 A1 * | 8/2004 | Ladas et al. | .................. 713/201 |
| 2006/0135065 A1 * | 6/2006 | Lee et al. | ..................... 455/41.1 |
| 2006/0258289 A1 * | 11/2006 | Dua | ............................. 455/41.3 |
| 2008/0133918 A1 * | 6/2008 | You et al. | ...................... 713/175 |

FOREIGN PATENT DOCUMENTS

KR 10-2004-0032815 4/2004

* cited by examiner

*Primary Examiner* — Brian Zimmerman
*Assistant Examiner* — An T Nguyen
(74) *Attorney, Agent, or Firm* — The Farrell Law Firm, P.C.

(57) ABSTRACT

Disclosed are a method and a system for Bluetooth communication. In the Bluetooth system, a Bluetooth device includes: a Radio Frequency Identification (RFID) reader for reading out RFID information from the RFID Tag within an effective transmission and receiving range and outputting the RFID information; a control unit for activating the RFID reader when a request for Bluetooth connection using the RFID is inputted by a user in a Bluetooth communication mode, extracting the bonding information from the RFID information inputted from the RFID reader, and outputting the bonding information; and a Bluetooth module for receiving the bonding information outputted from the control unit, pairing the first Bluetooth device using the bonding information, and performing Bluetooth communication.

8 Claims, 3 Drawing Sheets

BLUETOOTH® SYSTEM AND BLUETOOTH® BONDING PROCESS

PRIORITY

This application claims priority to an application entitled "Bluetooth® System and Bluetooth® Bonding Process" filed with the Korean Intellectual Property Office on Feb. 8, 2006 and assigned Serial No. 2006-12292, the contents of which are incorporated herein by reference.

BACKGROUND OF THE INVENTION

1. Field of the Invention

The present invention relates generally to Bluetooth® (hereinafter "Bluetooth") communication, and in particular to a method and system for easily performing a bonding (or pairing) process for Bluetooth communication.

2. Description of the Related Art

Bluetooth is a standard for wireless connection between portable devices, such as a portable PC and a mobile phone, for short-range wireless communication at a low cost. Bluetooth-enabled digital devices can communicate and exchange voice and data between each other using a radio frequency of license-free Industrial, Scientific and Medical (ISM) radio bandwidth at 2.45 GHz. For example, Bluetooth technology implemented in a mobile phone and a laptop computer can wirelessly connect the two devices, eliminating the need for any physical cable connection. Actually all digital devices such as PDAs, desktops, facsimile machines, keyboards and joysticks can be part of a Bluetooth system.

FIG. 1 is a view illustrating devices connected for typical Bluetooth communication Bluetooth devices refer to digital devices having a built-in Bluetooth module and capable of Bluetooth communication. A user terminal 100 with a built-in Bluetooth module establishes a wireless connection with peripheral Bluetooth devices 110 to 150 and supports point-to-point and point-to-multipoint connections. After inquiring about Bluetooth devices in range, the user terminal 100 displays information on the detected Bluetooth devices 110 to 150. The user terminal 100 can request a connection to at least one of the detected Bluetooth devices. The user terminal 100 that has requested the connection acts as a master and the other connected devices as slaves for the duration of connection. The user terminal 100 will become a slave if any of the connected Bluetooth devices requests a connection to the user terminal 100.

However, such a connection between Bluetooth devices can have a security problem because the user terminal can establish a connection to other devices and transmit data whenever the user desires. In order to solve the security problem, a Bluetooth service generally has three security modes. Each Bluetooth device operates in one mode for a single duration of connection. The user can set the mode.

Mode 1 is a non-secure mode, which allows all connections by any device without any security procedures (e.g. authentication and encryption). Mode 1 is used in communication which does not require security protection. Mode 2 provides service-level enforced security, usually controlling access to the Bluetooth services and devices. Various security policies and trust levels can be defined on simultaneously operating applications to limit access to some services. Mode 3 provides link-level enforced security and requires security procedures, (i.e. authentication and encryption) based on a link key shared between the Bluetooth devices.

In order to exchange data between Bluetooth-enabled devices (for example, Bluetooth mobile phones) or make a call in walkie-talkie mode, a connection channel between the two devices should be established. For this connection, an authentication procedure, i.e. pairing between the two devices, is implemented. Simply, a master device requesting the connection should be in one of an inquiry scans state and a page scan state to inquire about nearby Bluetooth devices. When a desired device is displayed on a display screen, the master device can select and page the device for connection setup.

During the pairing procedure, the master device generates a Personal Identification Number (PIN) Code (window. When the user enters a PIN Code of the device desired to be connected, the master device attempts to establish a connection with the desired slave device. At this time, the same window requesting the input of the PIN Code is generated on the display screen of the slave device. When the user of the slave device enters the same PIN Code as entered into the master device, the two Bluetooth devices can exchange a link key using the entered PIN Code, Bluetooth device address ("BD_ADDR") and random number ("RAND").

The link key is offered to the two Bluetooth devices for use in the authentication procedure. The link key, however, should be unique to the connection between the two Bluetooth devices.

Upon establishing a connection channel between the two devices, a common link key allocated by the PIN Code is used for authentication. If no common link key is not available, a link manager automatically implements an initialization procedure to exchange a link key.

This procedure consists of the following steps:
1. Creation of an initialization key;
2. Generation of a link key;
3. Link key exchange;
4. Authentication; and
5. Generation of an encryption key in each device (optional).

The two Bluetooth devices can initiate a Bluetooth communication immediately after the initialization procedure. In certain cases, the connection between the two devices can be disconnected due to an error in any of the above steps. If encryption is requested for the Bluetooth communication, a Secure And Fast Encryption Routine (E0 SAFER)+ algorithm is implemented using a proper encryption key allocated by the link key. The E0 SAFER+ algorithm produces a 128-bit link key following the input of a PIN Code in Bluetooth devices.

As explained herein, multiple preparative steps including authentication for security are implemented for pairing before establishing the connection between the Bluetooth devices. Users of the Bluetooth devices have to wait until a successful connection setup without recognizing those steps. Also, messages transmitted wirelessly during the pairing procedure can often be lost. Consequently, the same messages should be resent repeatedly.

SUMMARY OF THE INVENTION

Accordingly, the present invention has been made to solve the above-mentioned problems occurring in the conventional art, and an aspect of the present invention is to provide a method and system for easily performing a pairing procedure for the connection between Bluetooth devices.

Another aspect of the present invention is to provide a method and system for acquiring bonding information necessary to establish a Bluetooth connection without undergoing procedures in a wireless network.

Still another aspect of the present invention is to provide a method and system for acquiring bonding information necessary to establish a Bluetooth connection using a Radio Frequency Identification (RFID).

In order to accomplish the above aspect of the present invention, there is provided a Bluetooth system including a first Bluetooth device having an RFID tag that stores bonding information of the device; and a second Bluetooth device for detecting a request for Bluetooth connection using an RFID, reading RFID information from the RFID tag, extracting the bonding information from the RFID information to pair the first Bluetooth device, and performing Bluetooth communication.

In accordance with another aspect of the present invention, there is provided a method for performing a pairing procedure for a Bluetooth connection, including activating an RFID reader when a request for Bluetooth connection using an RFID is inputted in a Bluetooth communication mode; reading RFID information from an RFID tag within an effective transmission and receiving range by the RFID reader; extracting bonding information of a counterpart Bluetooth device detected in the range from the RFID information to pair the counterpart Bluetooth device; and performing Bluetooth communication.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, of the present invention will be described with reference to the accompanying drawings. In the following description of the present invention, a detailed description of known functions and configurations incorporated herein will be omitted when it may make the subject matter of the present invention unclear.

Figure 1:
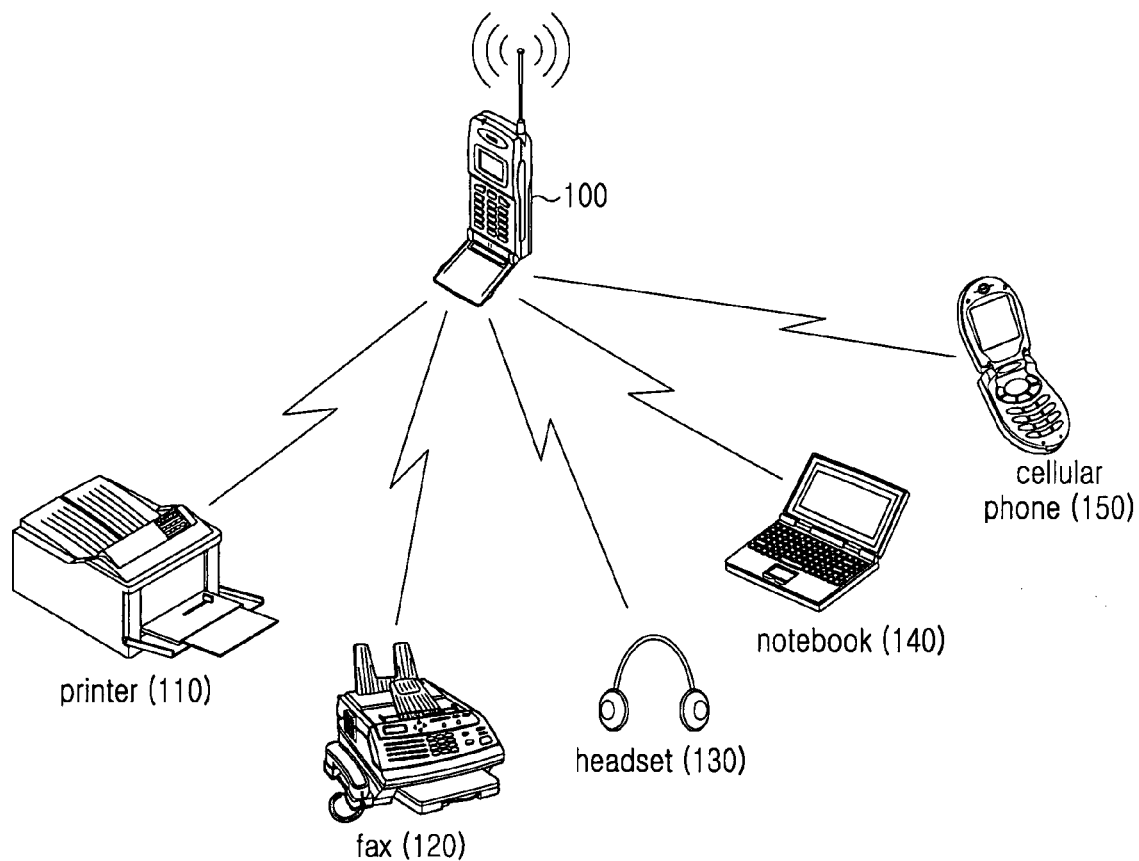
FIG. 1 is a view illustrating Bluetooth devices connected for typical Bluetooth communication.
Figure 2:
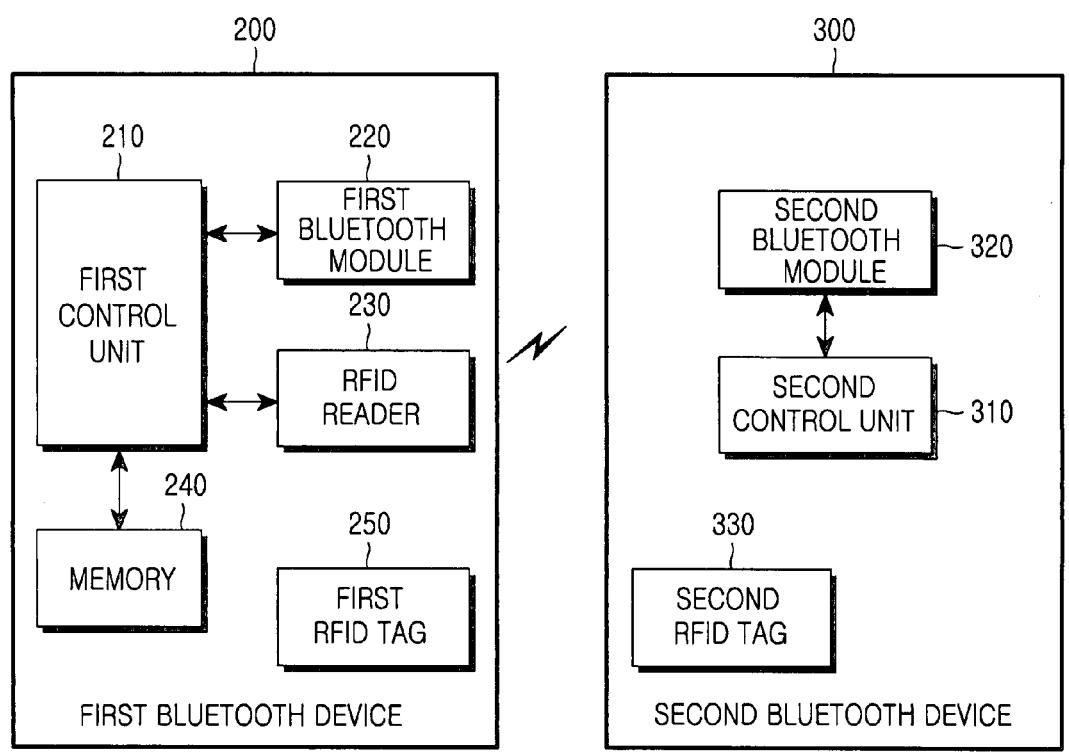
FIG. 2 is a block diagram illustrating Bluetooth devices according to of the present invention.

FIG. 2 is a block diagram illustrating the configurations of two Bluetooth devices according to the present invention. Bluetooth devices refer to digital devices having a built-in Bluetooth module and capable of Bluetooth communication. For example, digital devices with a built-in Bluetooth module, such as mobile phones, wireless headsets, PDAs, desktops, facsimile machines, keyboards and joysticks, are Bluetooth devices.

Referring to FIG. 2, a Bluetooth system includes a first Bluetooth device 200 and a second Bluetooth device 300 capable of performing Bluetooth communication with the first Bluetooth device 200. In the following description of a preferred embodiment of the present invention, it is assumed that the first Bluetooth device 200 functions as a master requesting a Bluetooth connection and the second Bluetooth device 300 as a slave receiving the request. The first Bluetooth device 200 can be a general digital device acting as a master, for example, a Mobile phone or a desktop. The second Bluetooth device 300 can be a peripheral device acting as a slave, for example, a keyboard, monitor or wireless headset.

As shown in FIG. 2, the first Bluetooth device 200 includes a first control unit 210, a first Bluetooth module 220, a Radio Frequency Identification (RFID) reader 230, a memory 240 and a first RFID Tag 250. The first Bluetooth module 220 can perform Bluetooth communication with other Bluetooth devices under the control of the first control unit 210. The RFID reader 230 reads out data in an RFID tag within an effective transmission and receiving range under the control of the first control unit 210.

The memory 240 stores programs for any processing or control by the first control unit 210, reference data, updateable data and various types of multimedia data to serve as a working memory for the first control unit 210.

The first RFID Tag 250 stores bonding information of the first Bluetooth device 200, i.e. a Bluetooth device address ("BD ADDR") and a Personal Identification Number (PIN) Code. The BD_ADDR and the PIN Code are unique values assigned to the first Bluetooth module 220.

The first control unit 210 controls overall operations of the first Bluetooth device 200. Particularly, the first control unit 210 controls the operations of the Bluetooth module 220 and the RFID reader 230 according to the user's key input. When the user inputs a request for Bluetooth connection using an RFID in a Bluetooth communication mode, the first control unit 210 activates the RFID reader 230 and displays a corresponding message. The user can input the request for Bluetooth connection by one of a selecting a corresponding menu and pressing a preset function key. The activated RFID reader 230 reads out RFID information from an RFID tag of a Bluetooth device detected in an effective transmission and receiving range, and outputs the RFID information to the first control unit 210. When the RFID information is inputted, the first control unit 210 extracts the BD_ADDR and PIN Code of the detected Bluetooth device from the RFID information, and outputs the extracted BD_ADDR and PIN Code to the first Bluetooth module 220. Then the first Bluetooth module 220 performs a pairing procedure for the Bluetooth communication with the detected Bluetooth device using the received BD_ADDR and PIN Code.

The second Bluetooth device 300 includes a second control unit 310, a second Bluetooth module 320 and a second RFID Tag 330. The second control unit 310 controls overall operations of the second Bluetooth device 300. Particularly, it controls the operation of the second Bluetooth module 320 according to the key input by the user The second Bluetooth module 320 performs Bluetooth communication with other Bluetooth devices under the control of the second control unit 310. Also, the second Bluetooth module 320 enables wireless signal exchanges between the second Bluetooth device 300 and any other Bluetooth device. The second RFID Tag 330 stores bonding information of the second Bluetooth device 300, i.e. a Bluetooth device address ("BD_ADDR") and a PIN code. The BD_ADDR and the PIN Code are unique values assigned to the second Bluetooth module 320.

The first Bluetooth device 200 having the above described configuration activates the RFID reader 230 when the user inputs a request for Bluetooth connection using an RFID in the Bluetooth communication mode. At the same time, the first Bluetooth device 200 displays a message indicating the activation of the RFID reader 230. The first Bluetooth device 200 reads RFID information from an RFID Tag within an RFID effective range. More specifically, to perform Bluetooth communication with a peripheral Bluetooth device, the user has to set the first Bluetooth device 200 to the Bluetooth mode and select a menu for Bluetooth connection using an RFID. When a message "reading an RFID" is displayed, the user has to locate the first Bluetooth device 200 in the vicinity of the peripheral Bluetooth device to be connected, for example, the second Bluetooth device 300. Meanwhile, the second Bluetooth device 300 should be in a registerable state, for example, a page scan state.

After reading the RFID information, the first Bluetooth device 200 extracts BD_ADDR and PIN Code of the second Bluetooth device 300 from the RFID information. Then the first Bluetooth device 200 performs a pairing procedure in a preset communication security level using the extracted BD_ADDR and PIN Code of the second Bluetooth device 300. When a Bluetooth connection between the first Bluetooth device 200 and the second Bluetooth device 300 is successfully established, the first Bluetooth device 200 generates a beep sound to inform the user of the connection setup.

Figure 3:
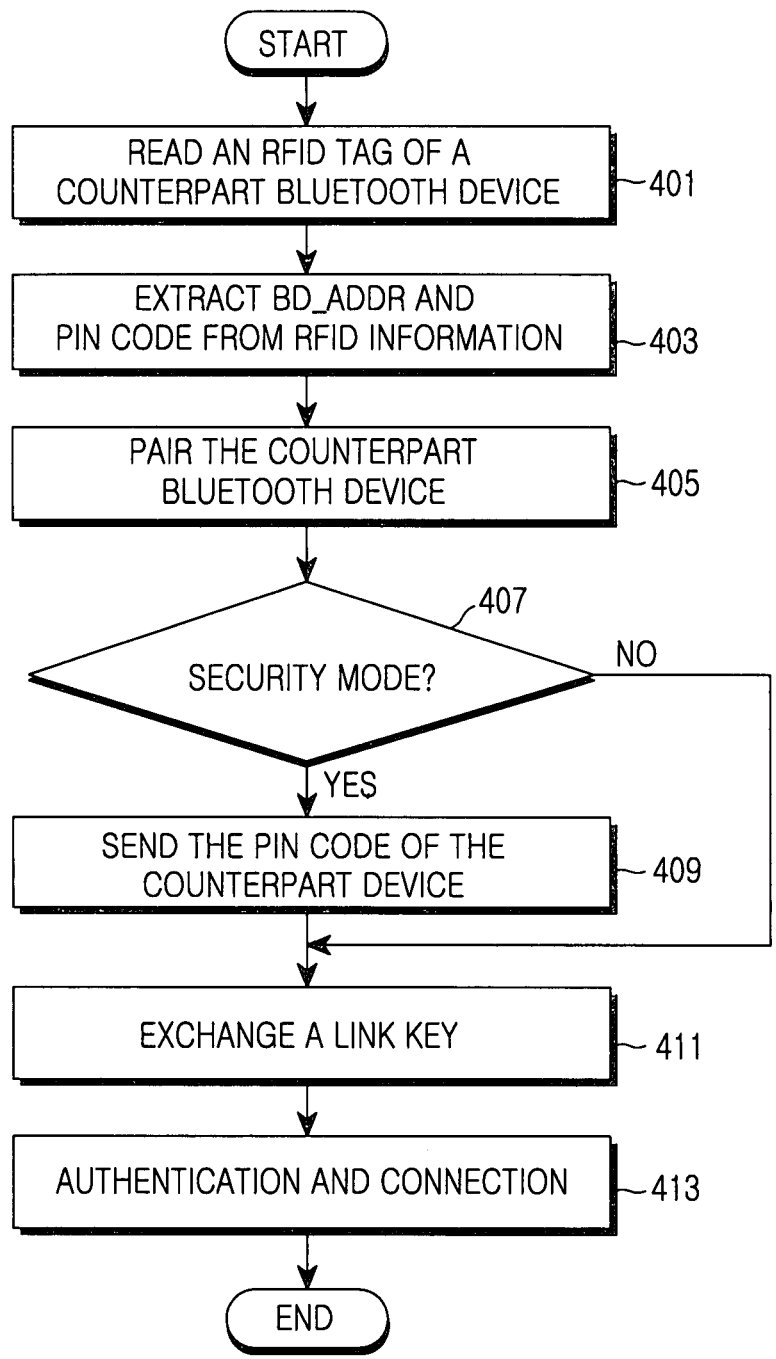
FIG. 3 is a flowchart showing the operations of a Bluetooth device for establishing a Bluetooth connection to another Bluetooth device according the present invention.

The operations of the first Bluetooth device 200 will be explained in more detail herein. FIG. 3 is a flowchart illustrating the operations of a Bluetooth device for establishing a Bluetooth connection to another Bluetooth device according to the present invention. Referring to FIG. 3, when the user inputs a request for Bluetooth connection using an RFID in the Bluetooth communication mode, the first Bluetooth device 200 proceeds to step 401 in order to activate the RFID reader 230 and read RFID information from an RFID tag of a Bluetooth device detected in an RFID effective range (e.g., the second Bluetooth device 300). In step 403, the first Bluetooth device 200 extracts BD_ADDR and PIN Code of the second Bluetooth device 300 from the RFID information. In step 405, the first Bluetooth device 200 performs a pairing procedure using the extracted BD_ADDR and PIN Code of the second Bluetooth device 300. In step 407, the first Bluetooth device 200 determines whether a security mode is set. If the security mode is set, the first Bluetooth device 200 will proceed to step 409. Otherwise, the first Bluetooth device 200 will proceed to step 411. The first Bluetooth device 200 sends the PIN Code of the second Bluetooth device 300 to the second Bluetooth device 300 in step 409 and proceeds to step 411. In step 411, the first Bluetooth device 200 exchanges a link key for an encryption procedure with the second Bluetooth device 300. When a Bluetooth connection between the first Bluetooth device 200 and the second Bluetooth device 300 is successfully established, the first Bluetooth device 200 generates a beep sound to inform the user of the connection setup in step 413. The Bluetooth connection is maintained until a request for disconnection is inputted by the user. If the first Bluetooth device 200 determines that the security mode is not set in step 407, it will proceed directly to step 411 in order to exchange a link key produced by an authentication algorithm. In step 413, the authentication and connection procedures are completed with the exchange of the link key. Meanwhile, the first Bluetooth device 200 generates a beep sound to inform the user of the connection setup.

As described herein, a BD_ADDR and a PIN Code which are unique to a Bluetooth device are stored in an RFID Tag of the device. A Bluetooth device reads out RFID information from the RFID Tag of a counterpart Bluetooth device detected in an RFID effective range, and extracts the BD_ADDR and PIN Code of the counterpart device to pair. The pairing procedure according to the present invention is simple and easy to understand. In the system and method for Bluetooth communication according to the present invention, users can easily acquire bonding information necessary to establish a Bluetooth connection without undergoing procedures in a wireless network.

Although the present invention has been described for illustrative purposes, those of ordinary skill in the art will recognize that various changes and modifications of the embodiment described herein can be made without departing from the scope and spirit of the claimed invention. For example, in the above description of the invention, a bonding process for establishing a connection between a Bluetooth device having an RFID reader and a counterpart device having no RFID reader has been explained herein. However, the same bonding process can be performed in two Bluetooth devices both having an RFID reader. Accordingly, various modifications, additions and substitutions can be made to the present invention, without departing from the scope and spirit of the invention as defined in the accompanying claims, including the full scope of equivalents thereof.

What is claimed is:

1. A first Bluetooth device comprising:
a Bluetooth module configured for performing Bluetooth communication with a second Bluetooth device;
a Radio Frequency Identification (RFID) reader; and
a controller configured for:
displaying a menu for Bluetooth connection using an RFID in a Bluetooth communication mode;
when the menu for the Bluetooth connection using the RFID is selected by a user, activating the RFID reader;
reading RFID information from an RFID tag of the second Bluetooth device through the RFID reader;
extracting bonding information from the RFID information, the bonding information including a Personal Identification Number (PIN) Code of the second Bluetooth device and a Bluetooth device address of the second Bluetooth device;
when determining that a security mode is set, sending the PIN Code to the second Bluetooth device and exchanging a link key for an encryption procedure with the second Bluetooth device; and
when determining that the security mode is not set, exchanging the link key for the encryption procedure with the second Bluetooth device without sending the PIN Code to the second Bluetooth device.

2. The first Bluetooth device according to claim 1, wherein the first Bluetooth device further comprises an RFID Tag that stores bonding information of the first Bluetooth device.

3. The first Bluetooth device according to claim 1, wherein said controller is further configured for informing the user when the RFID reader is activated.

4. The first Bluetooth device according to claim 3, wherein the controller is further configured for informing the user when pairing and connection between the first Bluetooth device and the second Bluetooth device are successfully established.

5. A method for performing a pairing procedure for a Bluetooth connection by a first Bluetooth device, comprising the steps of:
displaying a menu for Bluetooth connection using a Radio Frequency Identification (RFID) in a Bluetooth communication mode;
when the menu for Bluetooth connection using the RFID is selected by a user, activating an RFID reader of the first Bluetooth device,
reading RFID information from an RFID Tag of a second Bluetooth device through the RFID reader;
extracting bonding information from the RFID information, the bonding information including a Personal Identification Number (PIN) Code of the second Bluetooth device and a Bluetooth device address of the second Bluetooth device;

when determining that a security mode is set, sending the PIN Code to the second Bluetooth device and exchanging a link key for an encryption procedure with the second Bluetooth device; and when determining that the security mode is not set, exchanging the link key for the encryption procedure with the second Bluetooth device without sending the PIN Code to the second Bluetooth device.

6. The method according to claim 5, further comprising storing bonding information of the first Bluetooth device in an RFID Tag of the first Bluetooth device.

7. The method according to claim 5, further comprising informing the user when the RFID reader is activated.

8. The method according to claim 5, further comprising informing the user when pairing and connection between the first Bluetooth device and the second Bluetooth device are successfully established.

* * * * *